June 6, 1939.  R. D. SMITH  2,161,207
SPRING MOTOR SPEED CONTROL
Filed May 6, 1930  3 Sheets-Sheet 3
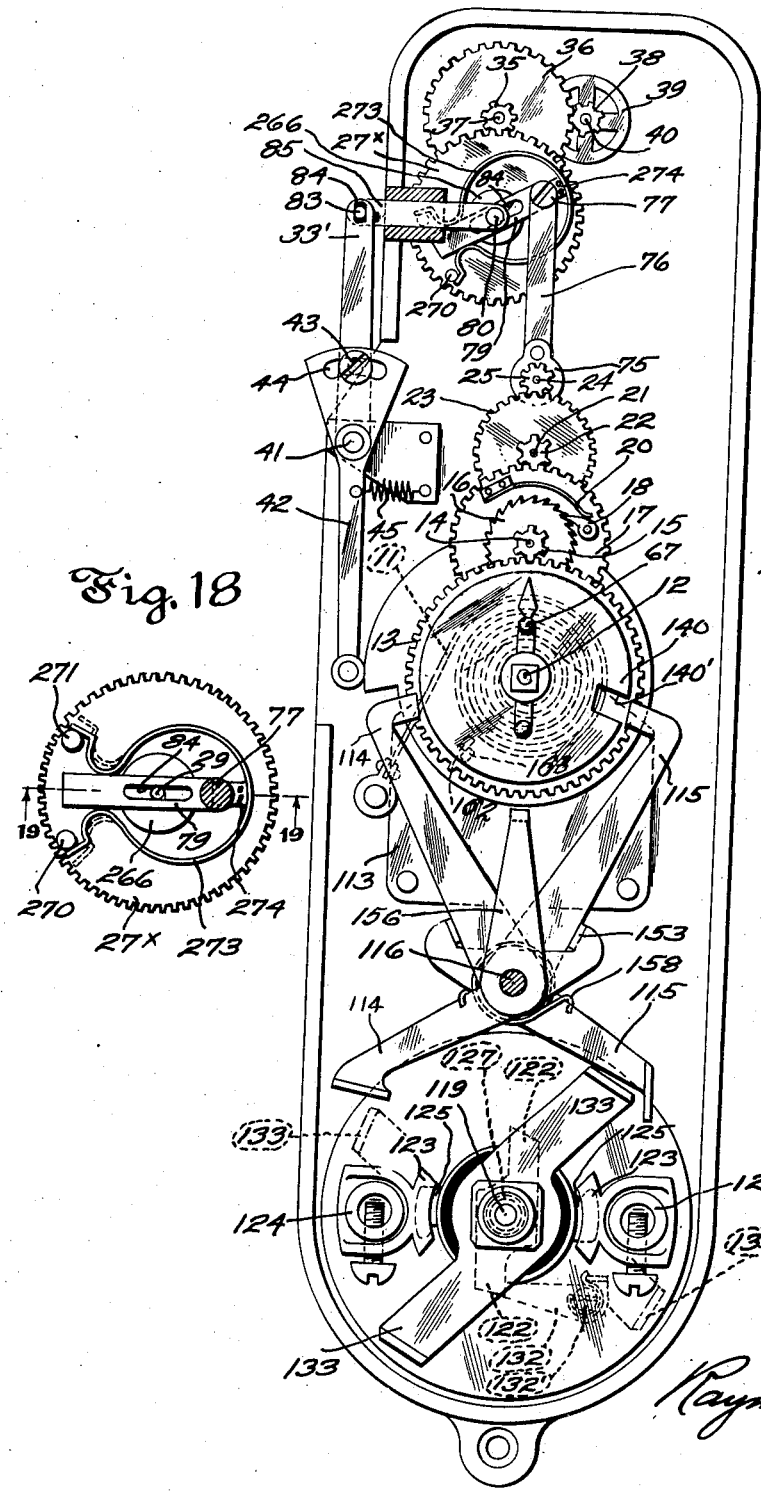
Fig. 17
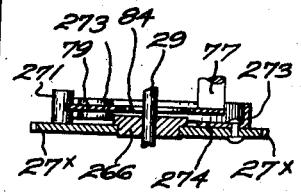
Fig. 19
Fig. 18
INVENTOR.
Raymond D. Smith Patented June 6, 1939

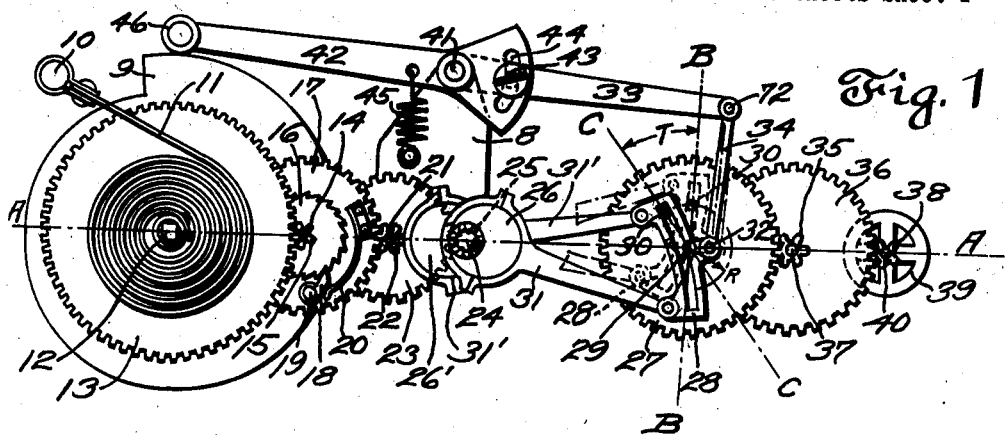

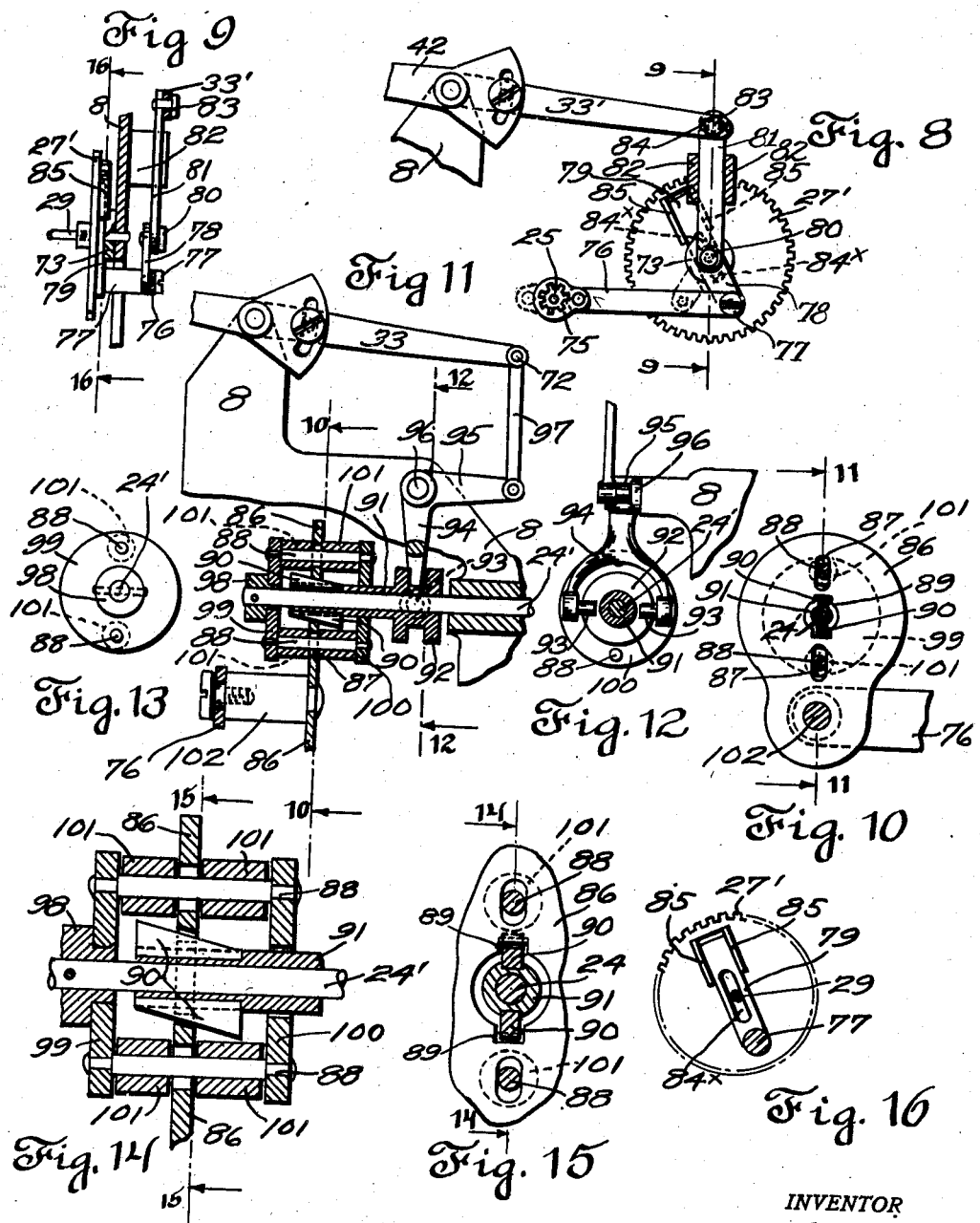

2,161,207

UNITED STATES PATENT OFFICE 2,161,207

SPRING MOTOR SPEED CONTROL

Raymond D. Smith, Pleasantville, N. Y., assignor to Tremont Products Corporation, Boston, Mass., a corporation of Massachusetts Application May 6, 1930, Serial No. 450,245

38 Claims. (Cl. 161—1)

This invention relates to refinements in, and additions to, the methods and mechanism for governing the speed and running characteristics of spring motors disclosed in my co-pending application Serial No. 353,792, filed April 9, 1929, now Patent No. 2,060,833, granted November 17, 1936.

In the retarding expedients utilized in my above patent there is a slowing down of the running speed of the spring motor consequent upon the retarding devices possessing a constant characteristic of resistance to the running tendency of the motor, whereas the force which drives the motor when embodied in a spring or other tensioned source of power, gradually diminishes with the running of the motor and the playing out of such spring. While a motor operating on these principles assumes a constant and dependable characteristic of speed variation corresponding to a power spring of given specifications and under given ranges of tension, and can therefore be relied upon to repeat its characteristic speed performance accurately upon successive windings of the power spring, and whereas the actual variation in the running speed of the motor is comparatively slight, examples of which are given from actual practice in the description hereinafter, it is nevertheless desirable for certain uses which I hereinafter point out, that the motor speed be rectified to a more constant velocity despite the depletion of power stored in the driving spring, and the present invention is illustrated by mechanism and methods embodying what I believe to be broadly novel principles whereby the above and related results may be accomplished.

Basically the mechanism herein disclosed as used for speed corrective purposes consists in means designed to alter the resistive effect of a retarding means so that such means shall exert a less and less retarding force as the stored power in the motor spring diminishes. In its essential nature, however, this mechanism will be recognized as a speed varying mechanism, for it would so function as a means for selectively varying the speed of a motor, whether the natural tendency of the motor uninfluenced by it, were to run at a constant or a non-constant speed. It may therefore be employed for varying and determining the speed of running of a motor for any purpose.

Thus if the selective speed spring motor of the present improvements be substituted for the constant speed clock-work type of time-giving movement disclosed in my co-pending application, Serial No. 616,549, filed February 2, 1923, now Patent No. 1,967,270, granted July 24, 1934, the different intervals of time which its running may cause to elapse before automatic action of an electric switch to make or break an electric circuit, or to motivate a gas valve or the like, may be made a function and result of different selected speeds of travel of the motor spring tensioning shaft rather than, as heretofore, a function and result of setting such spring tensioning shaft to different time determining stations variously spaced from a normal or starting or zero station for such shaft.

Illustration herein of the present improvements therefore includes a showing of pertinent mechanism copied from the disclosures of both of my above mentioned patents.

In the drawings, Fig. 1, is a diagrammatic view of a spring powered train of gears, an independent, intermeshed train of retarding gears, an operating connection between the two, and a speed governing device for working on the operating connection, all comprising a spring motor illustrative of one form of the present invention.

Fig. 2 is like Fig. 1 showing the change that takes place in the above mentioned speed governing device as the motor nears the end of its run, the power spring and the gears constituting the power train being omitted.

Fig. 3 shows a centrifugal speed governor substituted for the cam operated speed governor of Figs. 1 and 2.

Fig. 4 is a chart explanatory of the speed characteristic of my improved spring motor.

Fig. 5 is a detail view of a time indicating and measuring dial which may be employed.

Fig. 6 shows a modified dial differing in its markings from the dial in Fig. 5 in a manner corresponding to the full line and dotted line speed curves of the chart in Fig. 4, and showing this dial carried in rotatably adjustable relation to and by an operating pointer handle for winding and setting in operation the spring motor either of this or of my above mentioned co-pending application.

Fig. 7 is an edgewise view of the parts in Fig. 6 shown in central vertical section as they would appear looking from the left.

Fig. 8 shows a construction for availing of the action of the speed regulating lever of the present invention to act upon substantially the same parts of a spring motor which are illustrated in Fig. 1 of my aforesaid Patent No. 2,060,833.

Fig. 9 is a view looking from the left at Fig. 8 showing a frame portion taken partly in section on the plane 9—9 in Fig. 8.

Fig. 10 is an enlarged view of a modified form for the crank of Fig. 8 wherein the radial distance from the axis of the crank to the point of pivotal connection of the connecting link which is actuated thereby is rendered variable during the running of the motor for purposes herein described and claimed, some parts being sectioned on plane 10—10 of Fig. 11.

Fig. 11 is a view of the structure comprising the crank of Fig. 10 and is taken in central vertical section in the latter figure and shows in addition the connections of this adjustable crank to the speed regulating mechanism.

Fig. 12 is a view taken partly in section on the plane 12—12 in Fig. 11 looking from the right.

Fig. 13 is a view looking at the left of Fig. 11.

Fig. 14 is an enlarged view of some of the parts in Fig. 11.

Fig. 15 is an enlarged view of some of the parts in Fig. 10.

Fig. 16 is a view taken on the vertical plane 16—16 in Fig. 9 looking in the direction of the arrows.

Fig. 17 is a view showing certain parts similar to those shown in Figs. 1 and 8 of my said Patent No. 1,967,270 in combination with my improved selective speed spring motor, said motor incorporating means for resiliently transmitting force from the oscillator to the balance wheel as shown in Figs. 7 and 8 of my other said Patent No. 2,060,833.

Fig. 18 is a view of certain retarder parts detached from the motor of Fig. 17 for resiliently transmitting force from the oscillator to the balance wheel, the adjustable support pivot for the oscillator being removed.

Fig. 19 is a view taken in section on the plane 19—19 in Fig. 18 looking in the direction of the arrows.

In Figs. 1 and 2, 11 is the power spring anchored at its outer free end to the frame stud 10 and at its inner end to the spindle 12 on which is fast the large gear 13 of the power train and the speed rectifier cam 9. There is the second spindle 14 to which is made fast the pinion 15, which is in mesh with gear 13, together with the ratchet wheel 16. Loosely rotatable on spindle 14 is the second gear 17 carrying the click 18 pivoted to gear 17 by the stud 19 and yieldingly pressed into engagement with the teeth of ratchet wheel 16 by the spring 20 mounted on gear 17. The third spindle 21 carries in fixed relation the pinion 22 (in mesh with gear 17) and the gear 23. The fourth spindle 24 carries the pinion 25 (in mesh with gear 23) and carries fixed to rotate with pinion 25 the two eccentric cams 26 and 26'. Cams 26 and 26' oscillate respectively the eccentric rods 31 and 31' which at their free extremities are jointed to a curved, slotted bar 28 which is otherwise pivotally suspended at 32 from the right extremity of the speed adjustor lever 33 by means of the suspension rod 34, pivoted at 72.

Projecting forwardly to engage with the curved slot in the bar 28 is a pin 30 carried fixedly by the gear 27 whose axis is at 29 at the junction of the horizontal center line A—A and of the dot dash lines B—B and C—C in Fig. 1. In mesh with gear 27 is the pinion 35 which turns fixedly with the gear 36 on spindle 37. In mesh with gear 36 is the pinion 38 which turns fixedly with some light rotary part illustrated by the balance wheel 39 on the spindle 40.

Referring back to the speed adjusting lever 33 it is seen to be pivoted in a frame partially shown at 8 at a common point 41 with the cam follower lever 42 and secured to turn fixedly in unison with lever 42 by the screw 43 passing through the curved adjustor slot 44 in the enlarged segmental extension of lever 42. A spring 45 pulls down upon the lever 42 causing the roller 46 to bear constantly on the periphery of the speed rectifier cam 9.

The operation of the above described parts is so apparent from the drawings that it will need little description. In Fig. 1 the motor is assumed to be at the beginning of its run and the power spring 11 fully tensioned. The roller 46 is raised to its highest point resulting in the pivot 32 being lowered to approximate alignment with the horizontal line A—A whereby the oscillations of the curved bar 28 as effected by the rotation of the eccentrics 26 and 26' cause a back and forth movement of the pin 30 and therefore of gear 27 through the angle T. In Fig. 2 the motor is at the end of its run, the power in spring 11 has become depleted and except for the compensating adjustment effected by cam 9 upon roller 46 the speed of running of the motor would have correspondingly slowed down. It will be observed, however, that the lowering of roller 46 has lifted the pivot 32 to a point well above the horizontal line A—A whereupon not only has the oscillatory travel of pin 30 been reduced from the angle T, Fig. 1 to the relatively small angle t, Fig. 2 but the leverage of the eccentric rods 31 and 31' and therefore of the eccentric cams 26 and 26' has been increased with regard to the travel of pin 30 thereby compensating to a pre-designed extent for the loss of power in spring 11 by making easier its action to overcome the inertia of the oscillating gear 27 which inertia is augmented by the relatively higher speed and greater number of revolutions imparted to the additional gear 36 and balance 39.

This particular mechanism has been selected from the many closely related arrangements of mechanism any one of which could be availed of for seizing upon the novel principles involved in this invention, because it is analogous to the well understood link motion valve gear long used to control the admission and release of steam from the cylinder of a steam engine. In practice it would be cumbersome to avail of so much complication of mechanism to accomplish the simple novel result of rectifying the otherwise diminishing speed of the spring motor but the object of this disclosure being to teach the principle which may be seized upon in devious ways, a familiar mechanism has been deemed most helpful to illustrate. It may be said that in designing an actual mechanism of this kind the object should be sought of so proportioning and relating the parts of the eccentric cams, eccentric rods, bar 28 and pivot 32, that there is the least possible sliding back and forth of the pin 30 in the curved slot of the bar. The broken line positions of the bar 28 in Figs. 1 and 2 show some little extent of sliding must take place between pin 30 and the sides of the slot in the particular shapes of these parts and their relationship as drawn, and it is a matter of mechanical design and of mechanical skill, rather than of invention, to minimize the extent of this sliding in actual practice. A substantial extent of slide is here pictured to illustrate the point.

Figs. 1 and 2 show a mechanism for automatically rectifying what would otherwise be a varying speed of a spring motor by resorting to a curvilineal element illustrated by the cam 9. Fig. 3 shows a substitute for the cam 9 which constitutes a speed responsive means for rectifying speed and while involving additional mechanism, completely and automatically insures uniform speed of the motor. In the latter figure showing of the power train is omitted except that the same power driven shaft 24 is shown and from which the substitute speed rectifying mechanism derives its movement. A lever 42' is shown as an operative equivalent of the lever 42 and this lever terminates in a follower yoke 47 adapted to be moved up and down by the groove 48 in a collar 49 vertically slidable on the upright, high speed spindle 50 in unison with the lower slidable anchorage 51 for spring arms 52—52 carrying the centrifugal weights 53—53, said spring arms 52—52 being secured to and rotated in unison with spindle 50 by the upper fastening collar 54 pinned to spindle 50. The spindle may have a top bearing in a frame portion 55 and a lower bearing in a frame portion 56 below which is pinned to the spindle 50 a bevel pinion 57 in mesh with a bevel gear 58 turning fixedly on the shaft 59 as does also the spur gear 60. Gear 60 is driven by gear 61 fast to pinion 62 and turning on the shaft 63 and pinion 62 is in mesh with gear 64 fast to and rotated by the shaft 24 of the power train not in Fig. 3 shown.

In operation the spindle 50 is, of course, driven at a much higher speed of rotation than the shaft 24 resulting in centrifugal force spreading the weights 53—53 as permitted by the flexibility in the springs 52—52 whereby the collar 49 lifts the follower yoke 47 of the lever 42' as the speed of the motor increases. Conversely lever 42' will be lowered as the speed of the motor decreases with the playing out of power spring 11 just as it is permitted to lower by the travel of cam 9 from its position in Fig. 1 to its position in Fig. 2 with the important difference that all variables tending to affect the speed of running of the motor, and not only the predeterminable variable of the power spring force, will be compensated for through any and all of the mechanisms hereinbefore described to the end that the motor will be governed to run with an automatically maintained uniform speed.

As a concrete example of a problem of speed variation easily cared for by the present improvements the chart in Fig. 4 illustrates graphically in the diagonal full line 65 a typical speed characteristic that might result in the performance of the swing gear retarded spring motor disclosed in Fig. 1 of my former application hereinbefore mentioned. Consider that the abscissa labelled "time" represent fifteen minutes duration of running of the motor and consider that the ordinates labelled "travel" represent from bottom to top of the chart 360-degrees total travel, or one complete revolution of the power spring spindle 12. The full line represents a curve plotted from the following data—

| Increment of time | Travel performed | Aggregate travel |
|---|---|---|
| | Degrees | Degrees |
| 1st minute | 26 | 26 |
| 2nd minute | 26 | 52 |
| 3rd minute | 26 | 78 |
| 4th minute | 26 | 104 |
| 5th minute | 25.5 | 129.5 |
| 6th minute | 24.5 | 154 |
| 7th minute | 24 | 178 |
| 8th minute | 24 | 202 |
| 9th minute | 24 | 226 |
| 10th minute | 24 | 250 |
| 11th minute | 23.5 | 273.5 |
| 12th minute | 22.5 | 296 |
| 13th minute | 22 | 318 |
| 14th minute | 21 | 339 |
| 15th minute | 21 | 360 |

A suitably designed mechanism involving the principles of action set forth in the foregoing description is capable of rectifying the small departure from uniform speed of travel represented by the full line curve 65 in Fig. 4 and cause same to be as uniform as is represented by the broken diagonal line 65' which as a graph of uniform motion would extend perfectly straight from corner to corner of the chart, equal increments of travel corresponding to equal increments of time.

I will now describe some of the practical applications of my improved speed regulating mechanisms by referring to Figs. 6 and 7 in which is shown the shaft 12 fitted at its operating end with a pointer 66 (in the way the shaft 40ᵇ is fitted with the pointer 84 in Figs. 24 and 25 of the drawings of my aforesaid Patent No. 1,967,-270), said pointer 66 having the two operating handles 67—67 and being shaped to carry in rotatably adjustable relation the time dial 68 adjacent to which a marker or index 69 is stationary with the casing 70.

By close observance of the graduations on dial 68 it will be seen that the graduations numbered to indicate minutes from zero to fifteen inclusive are not equally spaced but are laid out to represent the increments of travel above described as represented by the full line graph 65 in the chart of Fig. 4. This will be readily apparent from a comparison of the dial 68 in Fig. 6 with the dial 71 in Fig. 5 where the marks indicating minutes are uniformly spaced according to the uniform speed of shaft 12 represented by the broken line graph 65' of the chart in Fig. 4 and which could be secured by the corrective speed governing mechanisms of this invention.

As a matter of fact, the difference between the truly uniform speed and the uncorrected speed would be so slight during one revolution of the shaft 12 that the uneven spacings of the time indicating marks on dial 68 would not be a serious matter but there are occasions where the unevenness of the graduations would prove troublesome. A case in point is where a time pointer handle such as 66—67 herein, is utilized both as a time measuring and winding control for an interval timing device. For example see the timing mechanism which is wound and set as to time by the pointer handle 45 or 50 in applicant's Patent No. 1,967,270 hereinbefore referred to. In a mechanism of this kind there is purposely provided an ability to manually reset or reduce any initial time setting effected by moving handle 45 away from a stopped position at zero for automatic return thereto by a spring motor which might take the form of the spring motor constituting the present improvement. Whereas the time dial of Fig. 5 could be fixed to the casing to be swept by the time setting pointer as a means of indicating the length of time it would take the pointer to return to zero from any chosen point on the dial, an evenly graduated dial such as that of Fig. 5 would accurately indicate and measure the true length of time it would take the pointer to travel back to zero regardless of whether the motor spring had been wound an extent equal to the extent of displacement of the pointer from zero only if the motor ran at a uniform speed regardless of how fully wound its power spring, and such dial would not accurately indicate the length of time required by the pointer to return to zero if the motor ran faster when the spring was fully wound. If, for making a dial which would accurately indicate the time of return of the pointer to zero from any point on the circle, we resort to an uneven spacing of the graduations to accord with the variation in the speed of the motor as represented by the dial in Fig. 6 we run into this trouble in a back settable timer, namely that we may originally displace the pointer and correspondingly wind the spring, say, three quarters of a full circle displacement from zero and the motor will start to carry the pointer back to zero at a correspondingly high rate of speed. Should we, under these circumstances, attempt to back-set or reduce the displacement of the pointer from zero without a corresponding unwinding of the power spring taking place, as would be permitted by the back setting clutch parts 42—43 of my said Patent No. 1,967,270, this would result in the pointer traveling over a portion of the graduated scale in which the graduations are more closely spaced than is a true indication of the speed of travel of the pointer. For the above described trouble there is available the expedient of mounting an unevenly graduated dial to be carried by the pointer as in Figs. 6 and 7 for use with a motor of un-uniform speed, or of rectifying the speed of the motor to make same constant by use of the mechanical principles constituting a part of the present improvement, and in the latter case the simple uniformly graduated dial of Fig. 5 may be used to measure and indicate time and rigidly fixed to the casing. Describing in greater detail the arrangement in Figs. 6 and 7, the dial 68 is friction held by the front and rear portions of the pointer 66 so that for special purposes it might be rotatively shifted with respect to said pointer but unless purposely so readjusted it will travel in unison with the pointer and serve the purpose of measuring the correct amount of angular displacement of pointer 66 from its starting position which is indicated by the index 69 stationed on a casing portion 70.

I show in Figs. 8 and 9 an arrangement of mechanism different from Figs. 1 and 2 whereby the effective radial distance at which the impelling force of the power train is exerted upon the first gear 27' of the retarding train is varied. In this Fig. 8 I have omitted the showing of the other wheels 36, 39 etc. of the retarding train which may be employed in their form shown in Fig. 1 or otherwise. In Figs. 8 and 9 it is assumed that regulating levers 33' and 42 (or 42') shall be governed by the running of the power train in either of the manners disclosed in Figs. 1 or 3, but in place of the link 28 oscillated by the eccentrics 26, 26' the shaft 24 of the power train is shown as rotating a crank 75 which may be similar in all respects to the crank 26 of Fig. 1 in my Patent No. 2,060,833 and operating a connecting link 76 the equivalent of link 31 or 31' in the said patent. But instead of link 76, which causes gear 27' to be oscillated as crank 75 rotates, being pivoted to a point such as 30 or 30' of my said patent and which travels at a fixed radial distance from the spindle or axis 29 (see Fig. 9) of the gear 27', I here pivot the end of this link 76 to a floating stud 77 to which is also pivoted a short suspension bar 78 and to the opposite end of which stud 77 is fixed a longer slide bar 79. The suspension bar 78 is pivoted to the lower extremity at 80, of a vertically slidable member 81 which is constrained by projecting portions 82—82 of the frame 8 in which the spindle 29 to which gear 27' is pinned has rigid bearing. At its top extremity the member 81 carries a stud 83 engaging an elongated slot 84 in the regulating lever 33' so that member 81 and the pivot 80 for the suspension bar 78 are raised and lowered by the movements of regulating lever 33'. The same pivot stud 77 is fast to the lower extremity of the before mentioned slide bar 79 which has an elongated slot 84× engaged by the spindle 29 and which at its opposite end engages in radially slidable relation with flanges 85—85 struck up from the metal of gear 27' being maintained flat against gear 27' by washer 73. Thus this slide bar 79 can shift diametrically with relation to the gear 27' to accommodate any raising or lowering of the pivot point 80, which while shown in Fig. 8 to be in concentric relation with spindle 29 will, for the purpose of shortening the radial distance of the path of oscillatory travel of pivot 77 from spindle 29, be lifted to a slightly higher plane than spindle 29 and conversely might be lowered to slightly below the spindle 29 for lengthening the radial distance of the path of travel of pivot 77 from spindle 29, in either case the free sliding of bar 79 in diametrical relation to gear 27' accommodating this shifting of the position of pivot 77 during and independently of the movement of the crank 75 and gear 27'.

In both the arrangements of Figs. 1, 2 and of Figs. 8, 9, there is necessary a small extent of sliding movement between some two of the parts which are transmitting the propelling force from the power train to the retarding train, and any friction or other form of resistance set up by this sliding movement is added to the retarding effect of the retarding part of the mechanism. In Figs. 10 to 13 inclusive I show a modification whereby these two factors which might interfere with accurate time keeping are done away with in favor of causing the change of leverage or of mechanical advantage which the power train exerts upon the retarding train to take place within the structure of the crank of the power train rather than in any of the parts of the retarding mechanism and the construction by which this is accomplished could as well be availed of as a method for accomplishing the varying of the radial distance from spindle 29 to the point on the retarding gear 27' at which the crank of the power train exerts its force. In either its application to the crank of the power train or to the power receiving arm 79 of the retarding gear 27' the modification shown in Figs. 10 to 13 inclusive is without the objection that any sliding takes place between power transmitting parts at any given setting of the regulating lever 33. Proceeding to a description of this construction the modified form of crank is seen to be composed of a diametrically slidable plate 86 the shape of which is most plainly shown in Fig. 10 and it being shown to have two elongated slots 87—87 for guiding studs 88—88 and a central aperture with key-way notches 89—89 designed to be a sliding fit edgewise upon the sloping edges of the fins 90—90 carried fixedly at the left extremity of a sliding sleeve 91 provided with the grooved head 92 engaged by the studs 93 of the yoke arm 94 carried at the lower end of the bell crank lever 95 pivoted at 96 to the frame 8 and pivotally connected by the drop link 97 to the extremity of regulator lever 33. The sleeve 91 may therefore be shifted from left to right and vice versa along and relative to the spindle 24' (which latter is provided with positive thrust means, not shown, preventing it shifting either left or right in its bearing in frame 8 partially shown in section) and while said sleeve and said spindle are rotating, and the spindle 24' carries pinned to it the hub 98 of a stud plate 99 to which are fixed the before described studs 88—88 which pass through the slots 87—87 in the crank plate 86 and are spaced and held together at their opposite extremities by the ring plate 100 which has a loose running fit upon the sleeve 91. The spacer collars 101 are of proper length to maintain the crank plate 86 in a plane perpendicular to the axis of rotation while freely and diametrically slidable responsive to shifting of position of the cam fins 90 axially of the spindle 29 thereby to vary the radial distance of a pivot stud 102 from the spindle 24' to which stud is pivoted the link 76 of the Figs. 8 and 9 herein or the link 31 or 31' or any of the corresponding links in my co-pending application Serial No. 353,792. Link 76 then connects at its opposite end (not shown in Fig. 10) either to the pivot 77 as shown in Figs. 8, 9, 18 and 19, or to the pivots 30, 30', or 69 shown in my hereinbefore mentioned Patent No. 2,060,833.

I want to point out in connection with the construction of Figs. 10 to 13 inclusive that any resistances which come into play owing to the function of the leverage shifting mechanisms is of infinitesimal effect because of taking place in the power train of the movement rather than the retarding train and leaves the retarding train entirely free to perform its retarding function according to the laws of free kinetic inertia without interference or interruption by any possible frictional effect. In practice I prefer to mount the spindle 40 (see Fig. 1) in frictionless conical or jewelled bearings.

It may be realized that all of the expedients constituting the present improvements are speed correctives for a change in tension of the power spring 11. It is true that it is old in the art of time keeping movements to cause a power spring such as 11 or some weight device employed in place of same to exert its rotative pull upon the winding arbor 12 in some variable way to compensate for changes in the amount of force delivered by the spring 11 such as by resort to conical pulleys carrying a cord or belt on which the spring exerts its power with increased leverage as it becomes unwound and the efforts of the present improvements are in part to provide a more compactly organized and positively acting mechanism for rectifying the variable speed due to variable power by which the motor is driven and to this end it is believed that the simple and freely acting link motion and cam action employed in the various modifications represent a mechanical solution of the problem more adaptable to commercial practice in the manufacture of sturdy, compact and low price spring motors for accurate time keeping uses and the language of the appended claims will therefore be understood as not intending to limit the breadth of the invention claimed to anything less than the broadest possible aspect of the mechanical principles represented in the assortment of practical embodiments herein disclosed and contemplates all fair mechanical equivalents or well known substitutes which may be made for the exact elements and combinations of parts defined.

I have found by experiment that it slows up the action of a spring motor such as depicted in Figure 1 of my Patent No. 2,060,833, merely to increase the weight, of the balance wheel 37' in said figure or to increase the radial disposition of its center of gravity. Certain of the appended claims, therefor, are directed to the substitution of a centrifugal governor such as the parts 51, 52, 53, etc., of Fig. 3 herein, for the simple said balance wheel 37 of the copending application, or for the balance wheel numbered 39 in Fig. 1 of the present disclosure. In such case, the governor parts would be related to spindle 38 as they are shown related to the spindle 50 in Fig. 3.

Referring now to uses of the improved speed varying mechanism hereinbefore described, for purposes other than to alter a self-varying motor speed in a way to make the varying speed more constant, Fig. 17 shows the spring tensioning shaft 12, of Fig. 1 and 2 put to the useful application of controlling the timed automatic action of an electric switch by means of escapement mechanism more fully illustrated and described in my Patent 1,967,270.

Fig. 17, however, shows enough of the switch operating and escapement controlling mechanism to make plain the combined function of same with the selective speed motor of the present invention. Any of the herein disclosed forms of my improved selective speed motor may be assumed as contained between and having bearing in the movement frame plates 113. The power spring 11 appears in broken lines behind the timer cam 140 which may rotate in unison with the spring connected shaft 12 and has the escapement permitting notch 140' in its otherwise continuous periphery. The spring tensioning handle 67 is usable for tensioning the shaft 12 for a selected period of time run before automatic electric switch action takes place. The duration of the time run, and consequently the interval of time which will elapse before automatic switch action, may be predetermined by adjusting the relationship of lever arms 42 and 33' by means of screw 43 and slot 44 as in Fig. 8.

The escapement controlling trip member or feeler lever 115 is shown as a bell crank member pivoted to the frame stud 116 and constantly urged to its position against the frame stop 153 by the light tension of spring 158. If desired, another and oppositely positioned bell crank lever 114 of similar shape may be incorporated in the mechanism for effecting double time controlled automatic actions of the switch as a result of one manual setting as is more fully explained in my said Patent No. 1,967,270, but as the number of automatic actions performed by the switch is immaterial to an understanding of the present improvements, it will suffice to state that lever 114 is not in a common plane with cam 140 and hence is free to yield clockwise to permit passing of either switch arm 133. Bracket 156 is rigid with the frame. To arrest cam 140 and stop the running down movement of the spring motor a stop lug 162 carried by and projecting from the back face of cam 140 engages a stop lug 163 carried by the frame plate 113 of the time movement. Thus it is seen that the shaft 12 in Fig. 17 is designed to run in a counterclockwise direction under power of the motor spring 11 just as in Fig. 1 the running direction of shaft 12 is counterclockwise, but the direction of rotation may be determined at will by the manner of assembling the motor parts within their frame plates 113, and is immaterial to the novel features of the improvements.

The switch arm 133 rotates about the switch tensioning shaft 119 and is carried in fixed relation to the electric contact switch blades 125 which in their full line position, as shown in Fig. 17, conductively bridge the stationary electric contact clips 123—123 carried by insulated binding posts 124—124 for the lead wires which are not shown. Means not herein shown, but which are fully illustrated in my patent No. 1,967,270, are provided for causing the contact blades 125 to follow up advance rotative movements of the switch shaft 119 with a snap action in a clockwise direction, and in addition to the means referred to shaft 119 carries a catch arm 122, shown in broken lines, adapted freely to pass a pawl 132 pivoted at 132' when advancing clockwise but engaging pawl 132 to prevent retrogressive movement after being so advanced.

The switch tensioning spring 127 which occupies the space between the switch shaft 119 and the surrounding switch blade carrying structure, is thus enabled to be tensioned by clockwise advance of the shaft 119 and urges the switch arm 133 to rotate correspondingly. This the arm is enabled to do by thrusting the lower end of trip lever 115 out of its path so long as the trip lever is free at its upper end to dip into notch 140' in cam 140. When, however, the timer cam 140 is displaced clockwise to perform an automatic slow return movement under the power of my improved selective speed motor, notch 140' is removed from position to register with lever 115 and the latter thereby becomes blocked by the periphery of cam 140 against yielding counter-clockwise about its pivot 116 until, under time control, the notch 140' returns into register therewith, or in other words, to its position as shown in Fig. 17. At this time the lever 115 dips into notch 140' and escapement of the switch arm therefrom is permitted, resulting in automatic circuit breaking action of the switch blades 125, which together with arm 133 now snap one quarter turn clockwise to their positions indicated by broken lines in Fig. 17.

Thus for any given displacement of the notch 140' the time that is required for the notch to return to escapement causing position is a function and result of the speed of rotation of motor shaft 12 as impelled by the running of the spring motor, and this speed, as has heretofore been explained may be varied and predetermined by selective adjustment of the relationship of regulator lever 33 or 33' to the associated lever 42. The operating period of the apparatus is thus varied to consume any desired interval of time before automatic circuit breaking action of the switch occurs by suitable relative adjustment of parts 33 or 33' and 42, the former of which in the illustrated forms of my speed regulating mechanism moves and determines the position of pivots 32 or 77 for the oscillating parts 28 or 79 respectively.

Lastly, attention is called to a feature of construction in Figs. 17 and 18, wherein is employed for purposes of noise deadening, shock-absorbing and general smoothing out of the oscillatory action, the expedient of a resilient element 273 secured to the balance wheel 27× for sliding engagement with the working end of the oscillatory bar 79. This bar is identical as to its manner of operation by the power train with the bar 79 of Fig. 16, and the coaction therewith of the resilient element 273 is like the coaction of the corresponding element with the part 68 as shown in Figs. 7 and 8 of my Patent No. 2,060,833 referred to hereinbefore, said part 68 being the oscillating bar of the retarding means of my said patent. Also following the construction proposed in the said patent, spring element 273 is riveted to the balance wheel 27× by means of its flange-like portion 274 and the normal positions of its free ends are determined by their bearing respectively against the studs 270 and 271 mounted on the wheel 27×, which permits yielding of the free ends of element 273 in separating directions as indicated by the broken line positions thereof. Fig. 18 shows the wheel 27× equipped with a hub 266 by which it is mounted on the spindle 29. Thus the oscillating bar 79 always transmits and receives forces to and from wheel 27× through the resilience of element 273 which comprises structurally a U-shaped leaf spring. It is also noted that the same resilient element 273 acts to transmit motion between the oscillator 79 and wheel 27× in one as well as the other direction of rotative movement.

What I claim is:—

1. In a spring powered motor, a prime mover including a crank, a retarding agent, a connection pivoted to said crank for operating said agent, and means for varying the radial distance between the pivotal connection of said connection to said crank and the axis of said crank, thereby to vary the retarding effect of said agent upon said crank.

2. In a spring motor, in combination with means for opposing the action of said motor with decreased effect as the power of the motor spring becomes depleted consequent upon its playing out with the running of said motor, speed regulating mechanism, a part of said mechanism connected to be automatically responsive to the degree of travel of said motor, and another part of said mechanism connected to act upon said retarding means without opposing the freedom of movement thereof and thereby operative to prevent the slowing up of said motor despite the depletion of power in said spring.

3. In a spring motor in combination, a prime moving mechanism, means for opposing the action of said mechanism with decreased effect as the power of the motor spring becomes depleted consequent upon its playing out with the running of said motor, speed regulating mechanisms, a part of said mechanism connected to be automatically responsive to the degree of travel of said motor, and another part of said mechanism connected to act upon said prime moving mechanism without affecting frictional resistance to the running thereof and thereby operative to prevent slowing up of said motor despite depletion of power in said spring.

4. Uniform speed producing mechanism for a spring driven motor, embodying in combination, a power train, a retarder, transmission means connected to cause said retarder to be oscillated by uni-directional running of said train, and a regulator arranged to shift positions corresponding to degrees of travel of said power train thereby to vary the mechanical advantage with which the power of said spring is exerted upon said retarder through said transmission means as the power of said spring varies with the running down of said motor.

5. Compensating mechanism for preventing the slowing down of the running speed of a motor powered by a spring consequent upon decrease in the tension of said spring occasioned by the running down of said motor, and embodying a rotor impelled by said spring, an oscillator, connections causing said oscillator to be moved by and in synchronism with the speed of said rotor, and non-frictional means responsive to degrees of travel of said motor to vary the non-frictional resistance which is offered by said oscillator to the travel of said rotor.

6. Compensating mechanism for preventing the slowing up of the running speed of a motor powered by a spring consequent upon decrease in the tension of said spring, and embodying a rotor impelled by said spring, an oscillator, connections causing said oscillator to be moved by and in synchronism with the speed of said rotor, and means positioned by the degree of travel of said motor thereby to govern the non-frictional resistance to the travel of said rotor which is offered by said oscillator.

7. Compensating mechanism for preventing the slowing up of the running speed of a motor powered by a spring consequent upon decrease in the tension of said spring, and embodying a rotor impelled by said spring, an oscillator, connections causing said oscillator to be moved by and in synchronism with the speed of said rotor, and means governed by the extent of travel of said motor from its full wound position thereby to determine the non-frictional resistance offered by said oscillator to the travel of said rotor.

8. Compensating mechanism to prevent the slowing up of the running speed of a motor powered by a spring consequent upon decrease in the tension of said spring, and embodying a rotor impelled by said spring, an oscillating retarder, connections causing said retarder to be rotatively moved in constant unison with the turning of said rotor, so that the inertia of said retarder acts constantly as a non-frictional force resisting the movement of said rotor, and means to vary the said force of resistance and to so automatically proportion same to the power delivered to said rotor by its said spring that the running speed of said motor shall continue substantially constant.

9. In combination with a motor powered by mechanical tension, an oscillatory body adapted to afford inertia, connections for transmitting force and movement reciprocally back and forth between said motor and said body, means for variously conditioning said connections thereby to vary and determine the leverage with which force is reciprocally transmitted through said connections between said motor and body, including an element arranged to be acted upon progressively by the continuous running of said motor thereby to automatically regulate the motor speed.

10. Speed regulating mechanism embodying in combination with a power motor, an inertia affording retarder pivotally mounted to oscillate about a fixed axis, a power transmitting member connected to be oscillated by said motor and pivotally mounted upon a movable support so that its pivotal axis may be shifted to different distances from said fixed axis of said retarder by adjustment of said support, and means affording reciprocal operating engagement between said power transmitting member and said retarder whereby the inertia afforded by said retarder acts to oppose the running of said motor, said means being constructed and arranged to permit the adjustment of said support for varying the spacing of said two axes without interruption to the continuous running operation of the motor, the retarder and the power transmitting member.

11. In a speed regulated motor, in combination, an inertia affording retarding agent, a varying source of power for said motor, connections arranged between said motor power source and said retarding agent so that said agent is caused to move whenever said motor moves and by the same power source, and a regulator arranged to act on said connections for varying the resistance to motor running offered by said retarding agent through the resistance of its inertia to impulses received through said connections from said power source, said regulator being arranged so to act in proportion to the duration of running of said motor thereby to compensate for variations in said motor power and render constant the running speed of said motor.

12. In combination with a power motor, an oscillatory body adapted to afford inertia, an eccentric rotated by said motor, mechanism for transmitting movement back and forth between said body and said eccentric and so arranged that said body is alternately accelerated and decelerated by uni-directional rotation of said eccentric whereby the inertia of said body opposes the rotation of said eccentric, and an adjustable device arranged to act upon said mechanism in a way to vary and determine components of force transmitted by said mechanism from said eccentric to said body and from said body to said eccentric.

13. In combination with a power motor, a pivoted body adapted to afford inertia, an eccentric rotated by said motor, mechanism for transmitting movement in both directions between said body and said eccentric and so arranged that said body is alternately accelerated and decelerated by uni-directional rotation of said eccentric, and an adjustable device arranged to act upon said mechanism in a way to vary and determine what components of the force of said motor shall be transmitted by said mechanism to said body.

14. In an apparatus adapted to cause other mechanism to operate after a predetermined time interval, a power device, an eccentric operatively connected therewith, an oscillator connected with the eccentric, and means associated with the oscillator for varying the operating period of the apparatus.

15. In an apparatus adapted to cause other mechanism to operate after a predetermined time interval, a power device, an eccentric operatively connected therewith, an oscillator adapted to be actuated by said eccentric, a balance wheel operatively connected with the oscillator, and means associated with the oscillator for varying the operating period of the apparatus.

16. In an apparatus adapted to cause other mechanism to operate after a predetermined time interval, a power device, an oscillator, means adapted to actuate said oscillator, a balance wheel having a yielding connection with the oscillator, and means for shifting the position of said oscillator with respect to the eccentric whereby the oscillations thereof may be varied to change the operating period of said apparatus.

17. In a timing mechanism, a power driven shaft, a member operatively connected with said shaft and adapted to cause the release of other mechanism after a predetermined time interval, an oscillator operatively connected with the shaft, a movable pivot supporting said oscillator and means for relatively moving said pivot whereby the oscillations of said oscillator may be controlled to regulate the operating period of said mechanism.

18. In a timing mechanism, a power driven shaft, a member operatively connected with said shaft and adapted to cause the release of other mechanism after a predetermined time interval, an oscillator operatively connected with the shaft, a movable pivot supporting said oscillator, and means for relatively moving said pivot whereby the oscillations per minute of said oscillator may be varied to increase or decrease the operating interval of said timing mechanism.

19. In a timing mechanism, a power driven shaft, a member operatively connected therewith and adapted to cause the release of other mechanism, an oscillator operatively connected with said shaft, and means for bodily moving said oscillator whereby the speed of said shaft may be controlled to vary the operating period of said timing mechanism.

20. In a timing mechanism, a power driven shaft, a trip lever operatively engaged therewith and adapted to engage a mechanism to be controlled, an oscillator operatively connected with said shaft, a movable pivot for said oscillator, and means whereby said pivot may be relatively moved to control the oscillation of the oscillator and the speed of said shaft.

21. In a timing mechanism, a power driven shaft, a lever operatively connected therewith and adapted to engage a mechanism to be controlled, an oscillator operatively connected with said shaft, a balance wheel yieldingly connected with said oscillator, and a movable support for said oscillator whereby the latter may be relatively adjusted to control the speed of said shaft and thereby vary the operating period of said timing mechanism.

22. In a timing mechanism, a spring actuated shaft, a lever operatively connected with said shaft and adapted to engage a mechanism to be controlled, an oscillator, means operatively connecting said shaft with the oscillator, a balance wheel yieldingly connected with the oscillator, and means for moving said oscillator relatively to said balance wheel whereby the oscillations of said oscillator may be controlled to vary the operating period of said timing mechanism.

23. In a timing mechanism, a spring actuated shaft having a lever operatively connected therewith and adapted to actuate a mechanism to be controlled, an eccentric also operatively connected with said shaft, a member operatively connected with the eccentric, a balance wheel having a yielding connection with said member, and means for relatively adjusting the position of said member to vary the operating period of said timing mechanism.

24. A timing mechanism comprising an eccentric, means for driving said eccentric, an oscillator having one end operatively engaged with the eccentric, a movable pivot for supporting said oscillator, a balance wheel, a resilient element operatively connecting the opposite end of the oscillator with said balance wheel, and means for relatively moving said pivot whereby the oscillations of said oscillator may be controlled to vary the timed operating period of said mechanism.

25. A timing mechanism comprising an eccentric, means for rotating said eccentric, an oscillator having one end operatively connected with said eccentric, a balance wheel, a resilient element secured to said balance wheel and having a portion slidably engaged with the opposite end of said oscillator, and means for bodily moving said oscillator to control the oscillations thereof and whereby the timed operating period of said mechanism may be varied.

26. The combination with a timing mechanism comprising a spring-actuated shaft having an eccentric operatively connected therewith, and also having a member adapted to be actuated by rotation of said shaft to cause it to engage a mechanism to be controlled, of an oscillator having one end engaged with said eccentric and provided with a movable support, a balance wheel yieldingly connected with the opposite end of said oscillator, and a device for relatively moving said support to control the oscillations of the oscillator, whereby the timed operating period of the mechanism may be varied.

27. In a spring powered motor, a power impelled driving rotor, a retarder body mounted to turn upon a fixed axis, a floating pivotal joint supported in a manner to revolve about said axis and connected to move in unison with the turning of said body, said joint being further constructed and arranged to be adjustable to different paths of travel at varying distances from said axis, and means connecting said pivotal joint to said rotor in a manner to cause said body alternately to accelerate and decelerate as said rotor runs in a continuous direction, whereby the leverage with which the driving force of said rotor is transmitted to said body may be varied and predetermined in proportion to the radial distance from said axis of the path in which said pivotal joint travels.

28. In a spring powered motor having a power train, in combination with said train, a pivotally mounted retarder device, power transmitting connections constructed and so operatively arranged between said motor and said device that the device is revolved in alternately reverse directions by unidirectional running of said power train, and a centrifugal governor constructed and arranged to act on said connections in a way to vary the leverage with which the latter transmit force from said power train to said device thereby to regulate the speed of running of the motor.

29. In combination with a motor powered by mechanical tension, an oscillatory body for opposing the running of said motor, connections for transmitting force and movement between said motor and said body so arranged that said body is alternately accelerated and decelerated by unidirectional running of said motor so that said body constantly presents inertia opposing the running of the motor, and means for variously conditioning said connections in a manner to predetermine the leverage with which the inertia of said body is presented to said motor through said connections.

30. A timing mechanism comprising an eccentric, means for rotating said eccentric, an oscillator having one end operatively connected with said eccentric, a balance wheel, a U-shaped resilient spring member fixedly secured to the balance wheel at a point midway the free ends of said member and having said free ends formed and disposed to engage with the opposite end of said oscillator, and means for bodily moving said oscillator to control the oscillations thereof whereby the timed operating period of said mechanism may be varied.

31. Speed governing mechanism embodying in combination, a motor whose speed is to be governed, a frame for said mechanism, a pivotal support on said frame, a motor retarding balance wheel mounted to oscillate about a fixed axis determined by said support, connections cooperatively arranged between said motor and balance wheel in a manner to be operated by the motor and to oscillate said balance wheel, a speed regulator constructed and arranged to be shifted in relation to said frame and to contribute to the support of said connections in a manner to vary and determine the operating relationship of said connections to said balance wheel and the leverage with which the former acts upon the latter.

32. Speed governing mechanism as described in claim 31, in which the said connections include an actuator constructed and arranged to impart swinging movement to said balance wheel and to be simultaneously movable in diametrical relation to the balance wheel.

33. Speed governing mechanism as described in claim 31, in which the said connections include a member having a bifurcated portion straddling said pivotal support for the balance wheel and pivotally constrained by said support.

34. Speed governing mechanism as described in claim 31, in which the said connections include a bar having a slot elongated lengthwise of the bar and penetrated by said pivotal support for the balance wheel in a manner to pivotally constrain said bar.

35. Speed determining mechanism embodying in combination, a motor whose speed of running is to be governed, a motor retarding balance wheel supported to oscillate about a stationary axis, connections cooperatively arranged between said motor and said balance wheel in a manner to be operated by the motor and to oscillate said balance wheel, said connections including an actuator arranged to impart swinging movement to the balance wheel and to be adjustably movable in diametrical relation to the latter, and means to hold said actuator in different relationships to said balance wheel.

36. In combination with a motor whose speed is to be governed, an oscillatory balance wheel, engageable yielding means carried by said wheel, a member slidably engaging said means and connected to be swung back and forth by the running of said motor, and a pivot device arranged cooperatively with said member to constrain the latter to swinging movement about a fixed axis and to permit sliding of said member in relation to said yielding means while the member performs swinging movement.

37. In mechanism for transmitting with variable leverage the power of a driven oscillator delivered to a retarding balance wheel, in combination with said oscillator and wheel, means defining a fixed axis of rotation for said balance wheel, means constructed and arranged to constrain said oscillator to swing about the said axis and to permit bodily shifting of the oscillator in diametrical relation to said balance wheel while both the oscillator and balance wheel perform oscillatory movement, and means selectively to vary and determine the diametrical relationships of the oscillator relative to the balance wheel.

38. In speed adjusting mechanism for a spring motor, in combination with said motor, a crank powered thereby, an oscillator connected to said crank to be reciprocated thereby and including a link and a pivoted swinging device operated by said link, a balance wheel connected to be impelled back and forth by the swinging movements of said device, a fixed pivot for said balance wheel, and a movable pivot constructed and arranged to contribute to the support of said device, whereby said movable pivot may be shifted toward and away from concentric relationship to said fixed pivot thereby to vary the leverage with which said oscillator acts upon said balance wheel.

RAYMOND D. SMITH.